US008220019B2

(12) United States Patent
Stearns et al.

(10) Patent No.: US 8,220,019 B2
(45) Date of Patent: Jul. 10, 2012

(54) REMOTE ADVERTISING SYSTEM

(75) Inventors: William Shattuck Stearns, Las Vegas, NV (US); Ernest C. Matthews, IV, Palm Springs, CA (US); James Gladney, Las Vegas, NV (US)

(73) Assignee: Internet Sports International, Ltd., Las Vegas, NV (US)

( * ) Notice: Subject to any disclaimer, the term of this patent is extended or adjusted under 35 U.S.C. 154(b) by 190 days.

(21) Appl. No.: 11/548,575

(22) Filed: Oct. 11, 2006

(65) Prior Publication Data

US 2007/0089134 A1    Apr. 19, 2007

Related U.S. Application Data

(60) Provisional application No. 60/725,253, filed on Oct. 11, 2005, provisional application No. 60/725,254, filed on Oct. 11, 2005.

(51) Int. Cl.
*H04N 7/10* (2006.01)
(52) U.S. Cl. ........................................................ 725/32
(58) Field of Classification Search .............. 725/41–43; 715/716
See application file for complete search history.

(56) References Cited

U.S. PATENT DOCUMENTS

| 5,949,411 | A | * | 9/1999 | Doerr et al. ................... 715/716 |
| 6,088,722 | A | | 7/2000 | Herz et al. |
| 6,460,040 | B1 | | 10/2002 | Burns |
| 6,575,831 | B1 | * | 6/2003 | Gonen et al. ................... 463/25 |
| 7,033,276 | B2 | * | 4/2006 | Walker et al. ................... 463/40 |
| 7,384,336 | B2 | * | 6/2008 | Torango ........................... 463/27 |
| 2002/0004424 | A1 | * | 1/2002 | Nelson et al. ................... 463/42 |
| 2002/0111210 | A1 | * | 8/2002 | Luciano et al. ................. 463/29 |
| 2002/0133438 | A1 | * | 9/2002 | Tarr .................................. 705/35 |
| 2003/0003988 | A1 | * | 1/2003 | Walker et al. ................... 463/21 |
| 2004/0077397 | A1 | * | 4/2004 | Hosaka ........................... 463/16 |
| 2005/0255911 | A1 | * | 11/2005 | Nguyen et al. ................. 463/25 |
| 2005/0277474 | A1 | * | 12/2005 | Barry .............................. 463/42 |
| 2006/0154724 | A1 | * | 7/2006 | Okuniewicz .................... 463/29 |

* cited by examiner

*Primary Examiner* — Joseph P Hirl
*Assistant Examiner* — An Nguyen
(74) *Attorney, Agent, or Firm* — Weiss & Moy, P.C.; Jeffrey D. Moy

(57) ABSTRACT

A remote advertising system and method are provided. The advertising media (such as video, pictures, audio and text) may be stored on computer servers. The advertising media is downloaded to one or more kiosks at scheduled intervals and displayed on a rotating schedule. Users may interact with the advertisement to request additional information relating to the advertisement to be displayed, purchase the advertised products and services, or print out tickets, coupons or the like for related or unrelated products and services.

7 Claims, 7 Drawing Sheets

An advertisement is designed, created, and stored as one or more computer files on one or more administration terminals

The stored computer files are uploaded to the one or more File Host Servers.

The advertisement from the stored computer files is registered into the advertisement database.

The advertisement is scheduled for download into the desired kiosk locations.

At a set interval, the advertisement is transmitted and downloaded into each kiosk marked for display.

The advertisement is displayed on a set schedule at the kiosk, rotating with other ads.

The number of times viewed, and touched by users, is recorded and uploaded to the one or more file host servers.

At the end of the scheduled run, the advertisement files are deleted from the kiosk.

FIG. 6

REMOTE ADVERTISING SYSTEM

RELATED APPLICATIONS

This application claims priority from U.S. provisional application No. 60/725,253 filed Oct. 11, 2005 entitled "REMOTE ADVERTISING SYSTEM" and is related to U.S. Provisional Application Ser. No. 60/725,254, filed Oct. 11, 2005, and entitled, "SPORTS GAMING AND ENTERTAINMENT NETWORK", incorporated herein by reference.

FIELD OF THE INVENTION

This invention relates generally to a remote advertising system and method for advertising and selling products and services to kiosk users. More specifically, this invention relates to such a system and method in which a variety of advertisements are transmitted by a host processing network to remote kiosks for display to users at the remote kiosks, and whereby users may select from the advertisements for additional advertising data relating to the selected advertisement.

BACKGROUND OF THE INVENTION

Goods and services have been advertised or marketed through conventional media channels, such as through television, radio, billboards, etc. Some companies advertise their goods and services through interactive promotional displays which typically use CD-ROM devices. With the advent of computers, advertising has been taken to a whole new level. Unfortunately, online advertising systems have traditionally relied on use of the internet, which may undesirably expose the user to products and services that compete with the advertised product and service. Additionally, such general access may not comply with certain gaming laws prohibiting bettors from accessing other sites.

Accordingly, there has been a need for a novel system and method for delivering advertising to remote users to promote their respective products and services to Kiosk users. The system and method allow advertisers to be showcased through banner and other interactive advertisements over the kiosk network with the knowledge that only information about their particular products and services will be accessible by users. Further, the system and method prevent bettors from accessing other sites. The present invention fulfills these needs and provides other related advantages.

SUMMARY OF THE INVENTION

The present invention resides in a remote advertising system and method which permits one or more advertisements to be simultaneously displayed on each of one or more remote kiosks for viewing and interaction by a kiosk user to obtain additional information for the selected advertiser to purchase the product or service being promoted.

The remote advertising system comprises, generally, host data processing means having means for receiving advertising data from one or more sources, means for collecting and loading the advertising data into one or more databases, and means for transmitting the advertising data to remote data processing means in at least one remote location for access by a user to the advertising data at the at least one remote location; display means at the at least one remote location for displaying said advertising data from which a selection is made for additional advertising data to be viewed; and interactive means operable by the user for selecting the additional advertising data to be viewed.

A network card or the like at the host data processing means and the remote data processing means permits, respectively, the host data processing means to receive data from said one or more sources and to transmit the data to the remote data processing means in at least one remote location and permits the remote data processing means to send and receive the data to and from the host data processing means.

The advertising data accessed by the user may be single media and/or multimedia advertising (e.g. text, video, audio, pictures, graphics, sound, etc.) that promotes products and services. The one or more sources may be one or more administrator terminals, the remote data processing means, or from a third party source if filtered for security reasons. The one or more databases may include an advertisement database, a schedule database, and a kiosk usage database. It is to be appreciated that other databases may be created within the confines of the invention.

A remote advertising method is also provided and comprises the steps of:

using a host processing means to collect from one or more sources advertising data;

processing the collected advertising data and loading the advertising data into one or more databases;

transmitting advertising data in the one or more databases from the host processing means to a remote data processing means in one or more remote locations;

displaying advertising data on a touch screen in the one or more remote locations at scheduled intervals from which a selection is made to view additional related advertising data;

accessing additional advertising data in the remote data processing means via a user interface to view selected advertising data previously transmitted to the remote location from the host data processing means.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 6 is a schematic block diagram of the general system process; and

DETAILED DESCRIPTION OF THE PREFERRED EMBODIMENTS

Figure 1:
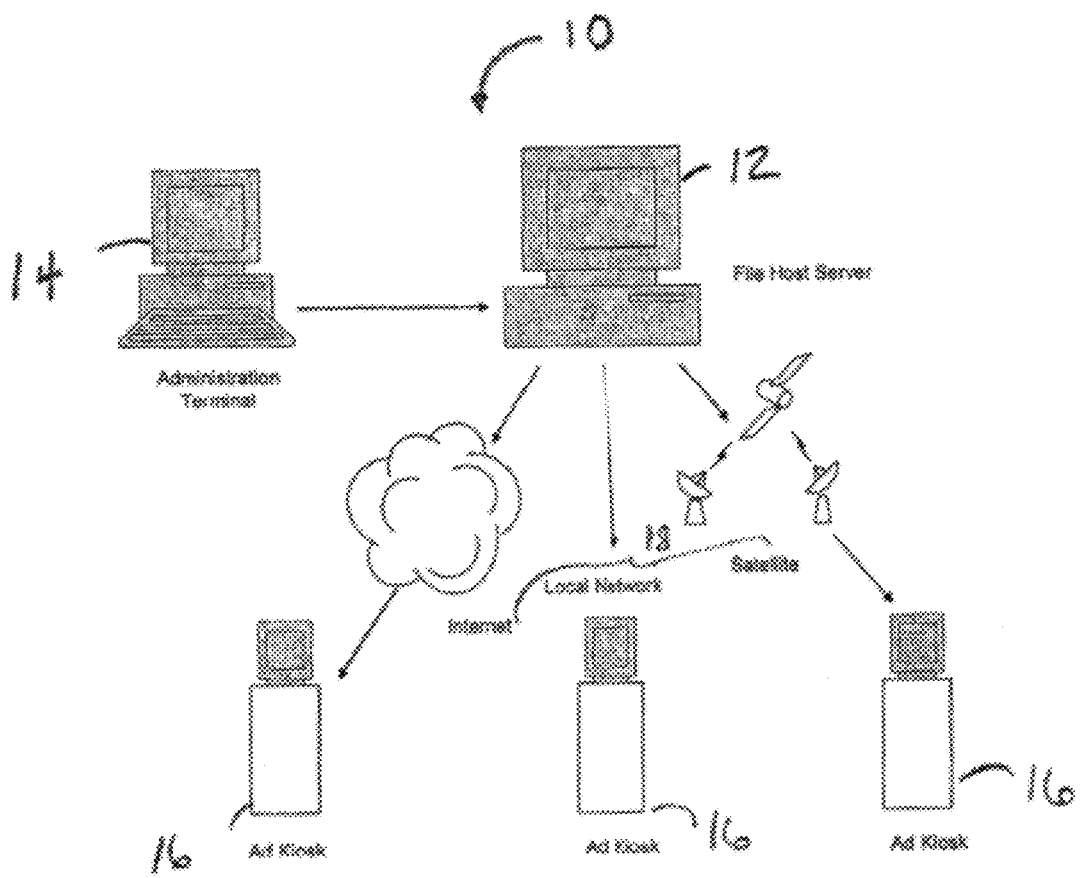
FIG. 1 is a schematic diagram of the basic hardware configuration of the invention.

As shown in the drawings for purposes of illustration, the present invention is concerned with a remote advertising system, generally designated in the accompanying drawings by the reference number 10. The system comprises, generally, one or more file host servers 12 in a host network coupled to one or more administration terminals 14 and with one or more remote kiosks 16 by using one or more communication protocols or channels 18. The one or more administration terminals 14 designs, creates and stores advertising data in one or more files. The administration terminals 14 are used to process advertising data received from one or more sources into the one or more files (See FIG. 6). Material received at the administrator terminals in an improper format may be suitably formatted by known methods. The one or more administration terminals 14 include a processor, web-browser, monitor and keyboard or mouse or other control device. The one or more administration terminals may further include speakers. The at least one administration terminal preferably utilizes a P4 or equivalent processor operating at 2.4 gigahertz speed, at least 20 Gigabytes of memory in the hard drive, two 512 Megabyte VRAM graphics accelerator cards, and a 15 inch touch screen monitor or equivalent, and having 1024 megabytes of RAM It should be understood that other suitable specifications may be utilized. The advertising data may be single medium or multimedia advertising (e.g. text, video, audio, pictures, graphics, sound, etc.).

Figure 7:
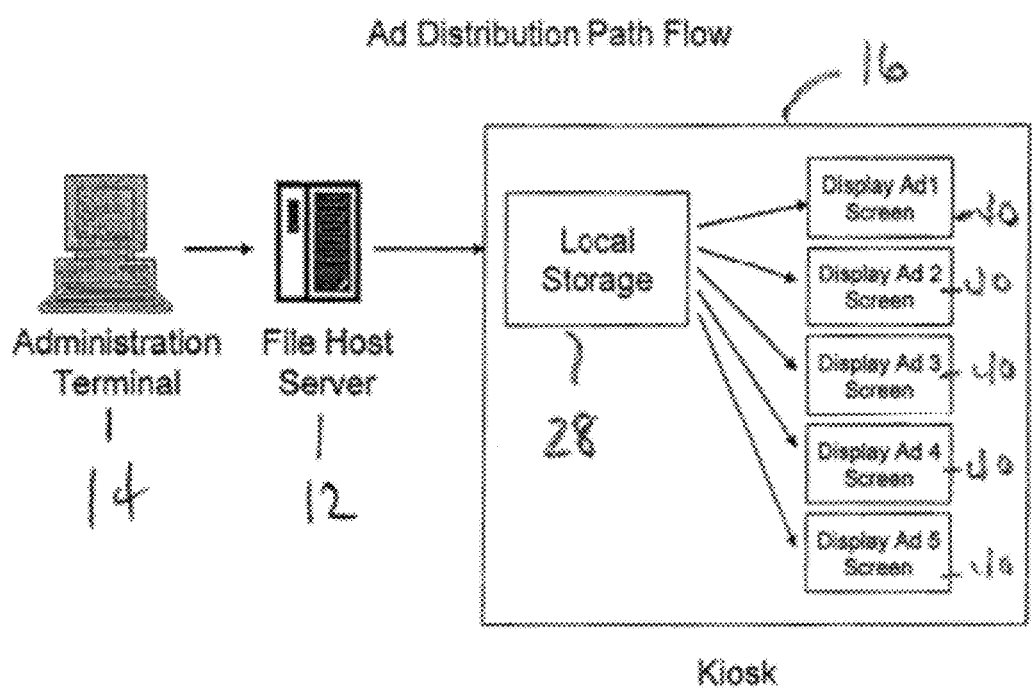
FIG. 7 is a flow diagram of the general process.

The advertising data from the one or more administration terminals 14 and other sources may be transmitted and uploaded to the one or more file host servers 12 for further processing (See FIGS. 6 and 7). The one or more file host servers 12 preferably utilizes a P4 or equivalent processor operating at 2.0 gigahertz speed, at least 400 Gigabytes of memory in the hard drive, one 512 Megabyte VRAM graphics accelerator cards, and having 1024 Megabytes of RAM. The file host servers may also include a network card or the like. The at least one file host server may run the following software components: Operating System: Internet Server Software such as Windows Server 2003. It should be understood that the file host server has scalable components and therefore its configuration is not confined to the particular configuration described herein. The at least one file host server hard drive stores the advertising media in the form of data files making up databases (See FIG. 6). These files may contain a combination of static images, video, text, audio data. Other databases include:

Schedule Database: A database containing Ad Media file names, Kiosk Identification codes and display schedule information for each individual kiosk.

Kiosk Usage Database, tracks the usage of each Kiosk, and keeps track of how many times an advertisement has been displayed.

Download Scheduler: A Service that determines if a kiosk requires new advertising material. If a kiosk needs to be updated, this service queries the database and initiates the download.

Ad Material Upload Manager, allows media uploads and management of all advertisement media files. The ad material upload manager configures the one or more databases and file management.

A Kiosk Health Monitor determines the operational status of each kiosk, and reports problems to the administrators via Web Page Updates and email.

A Network Security Watch Dog guards against unauthorized network intrusions.

Figure 2:
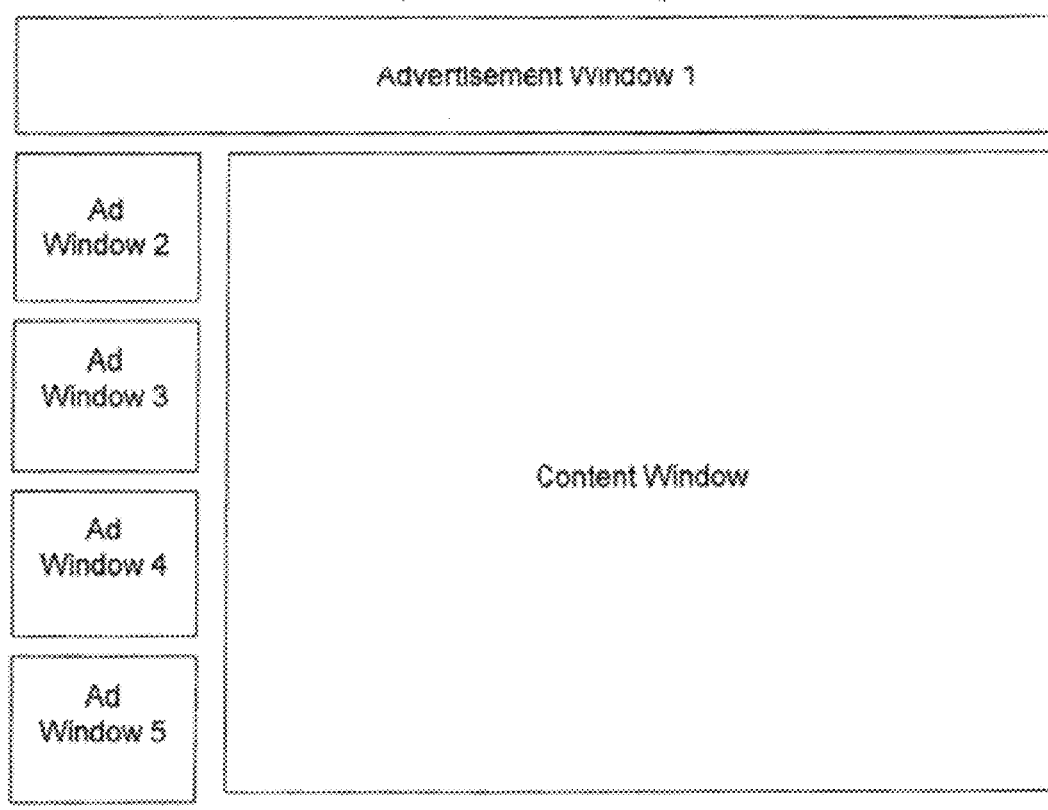
FIG. 2 is a schematic of an exemplary kiosk screen layout.

The advertising data is then transmitted from the one or more file host servers to the one or more remote kiosks 16. Referring to FIG. 2, each remote kiosk 16 may include at least one processor 20, connected via communications protocol as hereinafter described with the file host server 12, a network card 22, one or more speakers 24 for displaying audio data, a touch screen display monitor 26 which provides an interface between the at least kiosk processor 20 and a user and local storage 28 and for displaying video images. The kiosk 16 may further include a printer 30 for printing related product and service tickets, coupons or the like.

The advertising data may be transmitted to the remote kiosks 16 at scheduled intervals. Each remote kiosk preferably utilizes a P4 or equivalent processor 20 operating at 1.5 gigahertz speed, at least 20 Gigabytes of memory in the hard drive, two 512 Megabyte VRAM graphics accelerator cards, and a 15 inch touch screen monitor 26 or equivalent, and having 512 megabytes of RAM. It should be appreciated that substantial benefit may be derived by utilizing other suitable specifications. The operating system may be Windows XP Embedded or other suitable software. The remote data processing means, display means, and interactive control means may be contained within the kiosks. Other equipment such as keyboards, bill acceptors and credit card readers may be added to the kiosk. The kiosks are connected with the one or more file host servers 12 via a number of different networks/protocols for transfer of data between the kiosk and the one or more file host servers. These protocols include: TCP/IP over Local Area Network, TCP/IP over Internet, and over Wireless and Satellite radio frequencies:

Local Area Network: The server and kiosks may communicate over TCP/IP an a Ethernet Local Area Network. All communications may be encrypted using 256 Bit AES.

Internet: The server and kiosks may communicate over the internet. Security is provided by using a Virtual Private Network (VPN). Each VPN tunnel may be encrypted.

Satellite: The server and kiosks may communicate over satellite, via TCP/IP. Again, all transmissions are encrypted. It should be understood that the connection between the one or more file host servers and the remote kiosks can be accomplished by other means.

Figure 3:
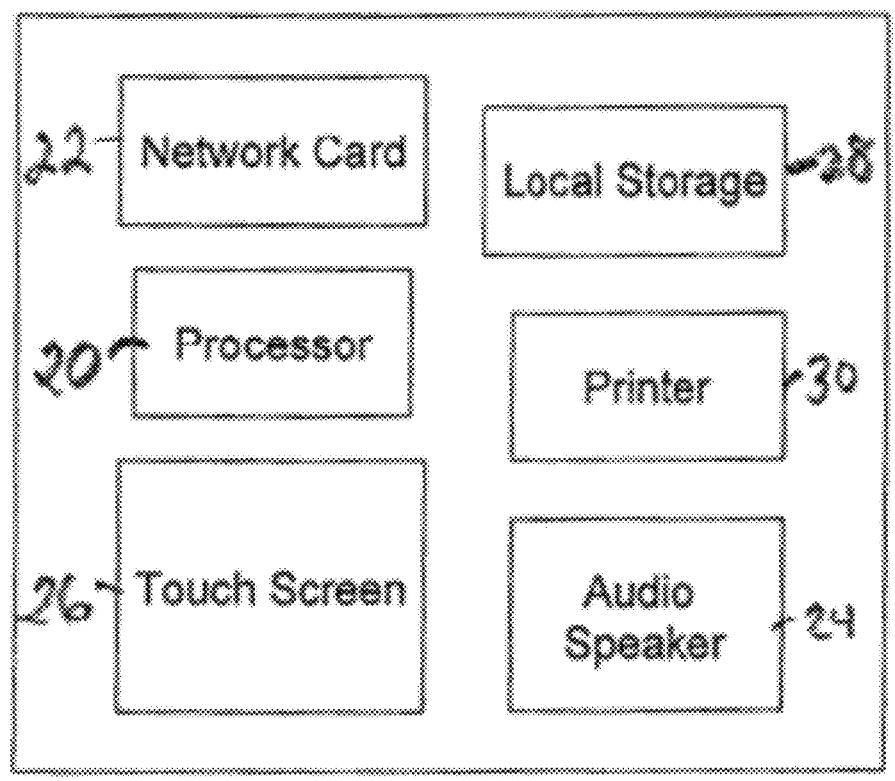
FIG. 3 is a schematic block diagram of the kiosk hardware components.

Referring to FIG. 3, the kiosk software processes may include a software and a hardware monitor 32 and 34 to keep track of the operating performance of the network, communications manager software 36 to track usage to log and report how the kiosk is being used. Data collected at the remote kiosk can be transmitted back to the file host server 12 by a scheduled software process for appropriate collection in a database and used to generate reports or other files for distribution or storage. An ad storage database 38 may also be included in the kiosk software processes.

Figure 4:
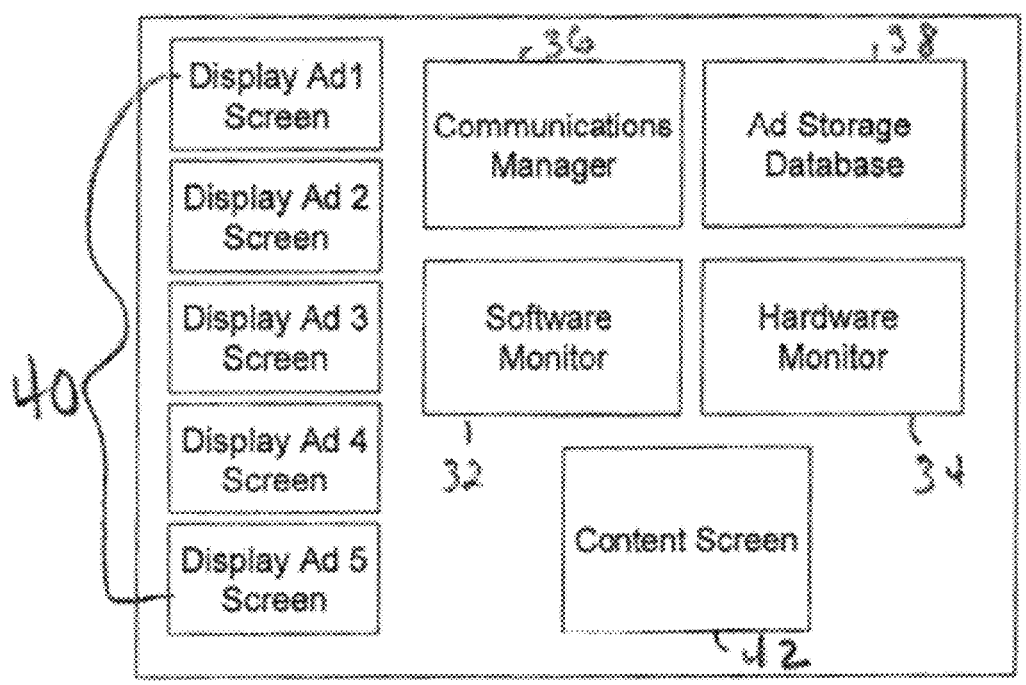
FIG. 4 is a schematic block diagram of the kiosk software processes.
Figure 5:
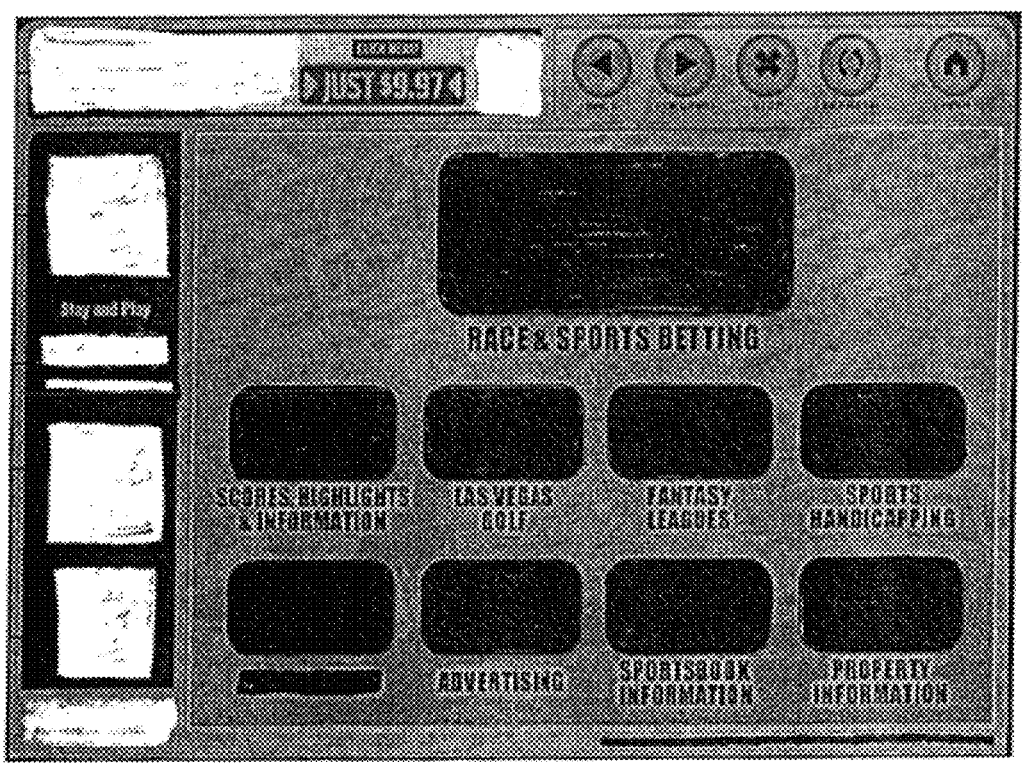
FIG. 5 is an exemplary screen shot of the kiosk screen corresponding to FIG. 2, the information redacted from the plurality of ad windows and from the plurality of cells in the content window.

The schedule may be downloaded from the one or more file host servers 12. At a set interval, the advertising data is transmitted and downloaded into each kiosk marked for display (See FIG. 7). The advertisement may be stored in local storage 28 at the kiosk. The advertisement is displayed on a set schedule, rotating with other ads. One or more ad windows 40 appear on the touch screen 26. Referring to FIGS. 3, 4, and 5, a plurality of ad windows 40 may be displayed with each including product and or service information along with a content window or screen 42. When one of the ad windows attracts the interest of a user, a user may select that ad window to view additional information relating to the products and/or services advertised in the selected ad window. This process may be repeated for all ad windows of interest. The number of times viewed, and touched by customers, may be recorded and uploaded to the file host server for reports, etc. At the end of the scheduled run, the files may be deleted from the local storage 28 in the kiosk(s).

The system and method may be used to advertise a wide variety of products and services in various product and service categories. It may appear that the customer is being directed to the advertiser's web site; however, to comply with certain gaming laws and protect against Internet access, the site is actually being stored on the file host server that mirrors the advertiser's own site, substantially preventing additional, more general access to other advertisers or improper online gaming sites.

A premium advertising fee may be charged to a limited number of advertisers in each category particular exclusivity and play time. For example, and not intended to be limiting, the advertising may relate to a sports category. Categories of sports related advertisers may include, without limitation, a sports handicapping service, sports merchandising companies and sports memorabilia providers. Liquor producers or distributors may be another category of advertiser. The system and method may be used to promote and advertise co-branded products and services. For example, as part of a "Make a Bet, Receive a Free Drink" program, a kiosk bettor in a casino may make a particular bet. If a kiosk bettor in a casino makes a sport's bet up to a certain amount, he/she may receive a coupon for a free drink or drinks in the category using the preferred alcohol beverage producer of choice. This coupon can be taken to the casino bar and presented for the drink. If the sport's bet is in excess of that threshold amount, the bettor may be able to choose a greater number of free drinks. The kiosk printer may print out a coupon (or otherwise signal the appropriate representative of the establishment hosting the "Make a Bet, Receive a Free Drink" program) evidencing the appropriate number of drinks to be received under this program once the bets have been made. Coupons, tickets and the like may be printed at the remote location or kiosk for other advertised products and services.

It is to be appreciated that the system and method may be utilized additionally on other gaming equipment, computers, and on interactive television systems or the like.

From the foregoing, it is to be appreciated that the Remote Advertising System permits advertisers to promote their respective products and services to Kiosk users. The system rotates a variety of advertisers on the Kiosk screen and allows the Kiosk users to connect with them at this point of purchase. When one of the rotating advertisements attracts the interest of a Kiosk customer, a simple click on the touch screen will direct the customer to additional information for that advertiser to purchase the product or service being promoted. The system and method allow advertisers to be showcased through banner and other interactive advertisements over the kiosk network with the knowledge that their products and services will be accessible by users. Further, the system and method prevent bettors from accessing the Internet, exposing them potentially to competing products and services. The user may receive coupons, tickets or the like relating to such advertised products and services with the ability to purchase the products and services at the kiosk.

Although a particular embodiment of the invention has been described in detail for purposes of illustration, various modifications may be made without departing from the spirit and scope of the invention. Accordingly, the invention is not to be limited, except as by the appended claims.

We claim:

1. A remote advertising system, comprising:
a host data processor for receiving an advertising site from one or more advertisers, collecting and loading the advertising site into one or more databases, and mirroring the advertising site from the one or more advertisers to at least one kiosk in at least one remote location for access by a user to the advertising site at the at least one remote location;
wherein the kiosk has a display for displaying the advertising site from which a selection is made for additional advertising data to be viewed;
an interactive control operable by the user of the kiosk for selecting the additional advertising data to be viewed;
wherein the kiosk permits the user to wager on a game of chance in at least either a first amount or a second higher amount;
wherein the kiosk permits the user to at least one of print a coupon relating to the advertising site and obtain a subject of the advertising site, based on an amount of the wager;
wherein the kiosk displays to the user that a wager in the first amount up to a threshold amount will automatically entitle the user to receive at least one of a coupon relating to a subject of the advertising site;
wherein the kiosk displays to the user that a wager in the second amount in excess of the threshold amount will automatically entitle the user to receive at least one of a higher value coupon relating to a higher value subject of the advertising site; and
wherein the kiosk enables the user to alternatively receive at least one of the coupon relating to the advertising site and obtain the subject of the advertising site, based on a wager in the first amount regardless of outcome, or at least one of the higher value coupon relating to the advertising site and the higher value subject of the advertising site, based on a wager in the second amount regardless of outcome.

2. A remote advertising method, comprising the steps of:
using a host processor to collect from one or more sources advertising data;
processing the collected advertising data and loading the advertising data into one or more databases;
transmitting advertising data in the one or more databases from the host processor to at least one kiosk in one or more remote locations;
displaying advertising data on a touch screen in the at least one kiosk at scheduled intervals from which a selection is made to view additional related advertising data;
enabling a user of the kiosk to view selected additional advertising data previously transmitted to the remote location from the host data processor;
enabling the user, at the kiosk, to place a wager on a game of chance;
wherein the user is permitted to place the wager in at least a first amount or in a second, higher amount;
displaying to the user that a wager in the first amount up to a threshold amount will automatically entitle the user to receive a coupon relating to a subject of said advertising data;
displaying to the user that a wager in the second amount in excess of the threshold amount will automatically entitle the user to receive a higher value coupon relating to a higher value subject of said advertising data; and
enabling the user to alternatively receive at least one of the coupon relating to said advertising data and obtain said subject of said advertising data, based on a wager in the first amount regardless of outcome, or at least one of the higher value coupon relating to said advertising data and the higher value subject of said advertising data, based on a wager in the second amount regardless of outcome.

3. The method according to claim 2, comprising deleting the advertising data in the at least one kiosk in the one or more remote locations at an end of a scheduled interval.

4. The method according to claim 2, comprising transmitting new advertising data in the one or more databases from the host processor to the at least one kiosk in one or more remote locations at an end of a scheduled interval.

5. The method according to claim 2, wherein transmitting the advertising data in the one or more databases from the host processor to the at least one kiosk in the one or more remote locations comprises transmitting the advertising data to each kiosk marked for display.

6. The method according to claim 2, wherein displaying the advertising data on the touch screen in the at least one kiosk at scheduled intervals comprises rotating the advertising data with other ads.

7. The method according to claim 2, comprising recording a number of selections made to view the additional related advertising data on the kiosk and providing the number of selections to the host processor.

* * * * *